United States Patent
Wang et al.

(10) Patent No.: US 7,702,000 B1
(45) Date of Patent: Apr. 20, 2010

(54) METHOD AND SYSTEM FOR WEIGHT GENERATION IN AN ADAPTIVE ARRAY WITH SPREAD SPECTRUM

(75) Inventors: James June-Ming Wang, San Marino, CA (US); Jack Winters, Middletown, NJ (US)

(73) Assignee: Motia Inc., San Mateo, CA (US)

( * ) Notice: Subject to any disclaimer, the term of this patent is extended or adjusted under 35 U.S.C. 154(b) by 884 days.

(21) Appl. No.: 11/352,187

(22) Filed: Feb. 10, 2006

Related U.S. Application Data

(60) Provisional application No. 60/651,884, filed on Feb. 10, 2005.

(51) Int. Cl.
*H04B 1/00* (2006.01)

(52) U.S. Cl. ..................................... 375/147

(58) Field of Classification Search ................. 375/130, 375/140, 144, 147–148, 150
See application file for complete search history.

(56) References Cited

U.S. PATENT DOCUMENTS

| | | | |
|---|---|---|---|
| 6,353,643 B1 * | 3/2002 | Park ............................. | 375/347 |
| 7,095,814 B2 * | 8/2006 | Kyeong et al. .............. | 375/347 |
| 2002/0054621 A1 * | 5/2002 | Kyeong et al. .............. | 375/147 |
| 2003/0219085 A1 * | 11/2003 | Endres et al. ................ | 375/350 |
| 2005/0059348 A1 * | 3/2005 | Chae et al. .................. | 455/63.4 |
| 2006/0176970 A1 * | 8/2006 | Dai et al. ..................... | 375/267 |

* cited by examiner

*Primary Examiner*—Jean B Corrielus
(74) *Attorney, Agent, or Firm*—Patentry

(57) ABSTRACT

The present invention comprises a method and system for weight generation in an adaptive array with spread spectrum signals. Signals received by each antenna are amplified, weighted and summed. Complex weighting is achieved by splitting the signal into inphase and quadrature components, and adjusting the gain of each of these components before combining these weighted components. The output signal after combining of the weighted signals from each antenna is downconverted to baseband, creating inphase and quadrature baseband components. The baseband components are multiplied by the spread spectrum sequence to despread the output signal and reduce the bandwidth of the desired spread spectrum signal to the original desired signal bandwidth. The signals received by each antenna are also downconverted to baseband inphase and quadrature components. Each of these components is multiplied by the spread spectrum sequence to despread the output signal and reduce the bandwidth of the desired spread spectrum signal to the original desired signal bandwidth. The despread/filtered individual antenna signals are multiplied by the despread/filtered output signal to generate antenna weights.

21 Claims, 7 Drawing Sheets

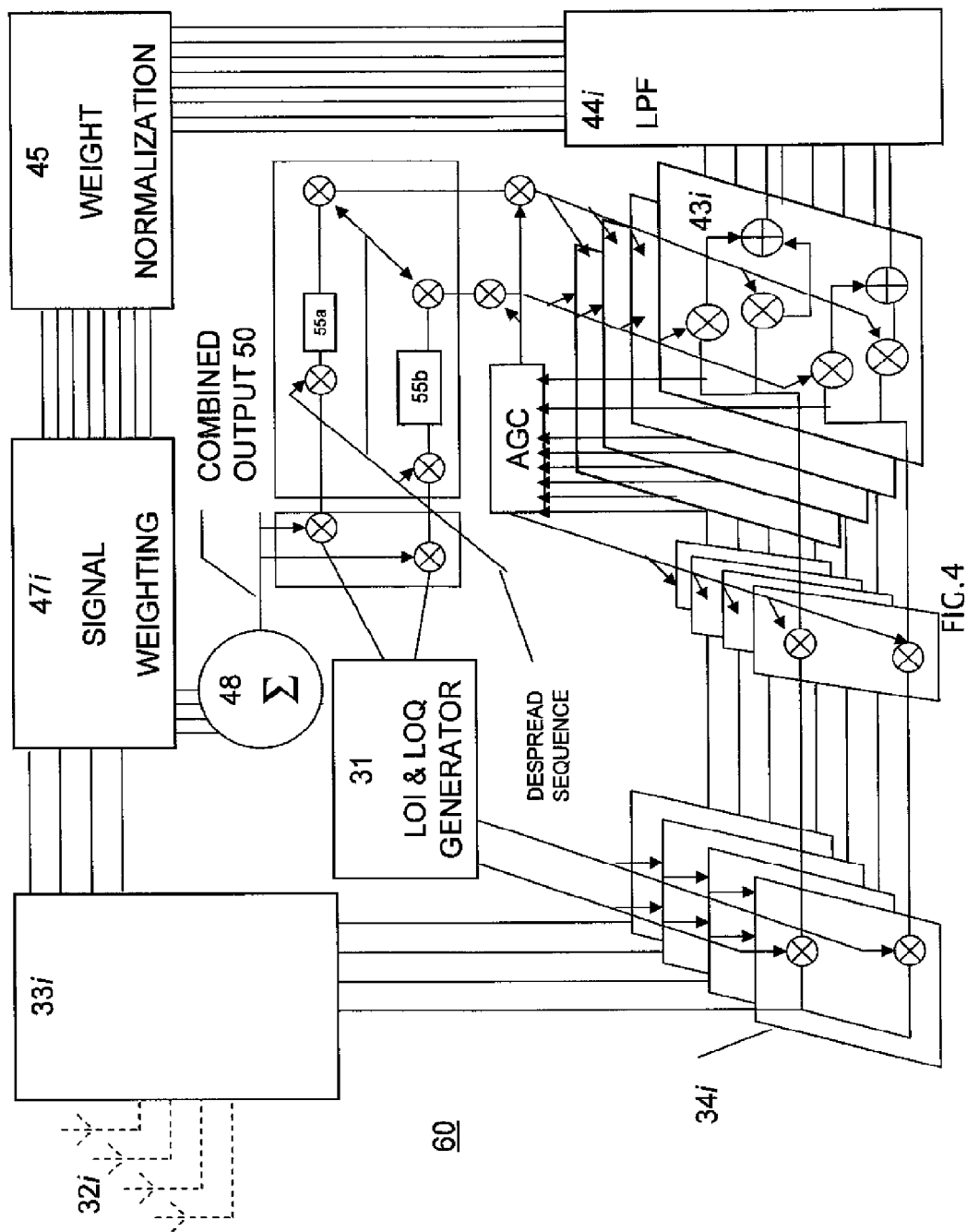

METHOD AND SYSTEM FOR WEIGHT GENERATION IN AN ADAPTIVE ARRAY WITH SPREAD SPECTRUM

CROSS REFERENCE TO RELATED APPLICATION

This application claims the benefit of U.S. Provisional Patent Application No. 60/651,884, filed Feb. 10, 2005, the entirety of which is hereby incorporated by reference into this application.

BACKGROUND OF THE INVENTION

1. Field of the Invention

This invention relates generally to wireless communication systems. More particularly, it relates to a wireless communication system using a plurality of antenna elements with weighting and combining techniques for optimizing antenna diversity and combining gain for use in a system that uses spread spectrum.

2. Description of the Related Art

FIG. 1 shows a prior art adaptive array 10. Adaptive array 10 comprises multi-element antenna 12 where the received signals are weighted and combined to produce output signal 14. There are M antenna elements, with weights W1 to WM.

Antenna weights are typically generated to improve the performance of the output signal. For example, the received signals may be combined to maximize the output signal-to-noise ratio (SNR) or the output signal-to-interference-plus-noise ratio (SINR).

FIG. 2 shows a prior art adaptive array with weight generation, where the weights are generated in weight generation module 17 from output signal 14 and each of received signals 16.

One method for generating antenna weights is maximal ratio combining (MRC), where the weights are generated to maximize the desired signal SNR. A simple implementation technique to generate weights that are similar to MRC is Granlund combining, where the output signal is correlated with the complex conjugate of the received signal at each antenna for the weights for the corresponding antenna. This technique is described in "Wireless Communication System using a Plurality of Antenna Elements with Adaptive Weighting and Combining Techniques," U.S. patent application Ser. No. 10/732,003, filed Dec. 10, 2003, hereby incorporated by reference into this application. This technique has the advantage that it is blind (does not require demodulation of the signal).

Spread spectrum is a method that can be used to suppress interference and distinguish desired and interfering signals. With spread spectrum, the desired signal (containing data at a given data rate) is multiplied by a higher rate pseudorandom sequence, which spreads the spectrum of the desired signal. The ratio of the bandwidth of the original desired signal (data bandwidth) to the spread spectrum signal is the spreading ratio. At the receiver, the spread spectrum signal is mixed with the spreading sequence and low pass filtered. The output is then the original desired signal, whereas any interfering signal is distorted and suppressed by the spreading ratio in the output signal.

Spread spectrum can be used as a method to distinguish the desired signal from interference in an adaptive array. One such technique is described in, "Spread Spectrum in a Four-Phase Communication System Employing Adaptive Antennas," *IEEE Trans. on Communications Special Issue on Spread-Spectrum Communications,* May 1982 and in *Spread-Spectrum Communications,* IEEE Press, NY, 1983. In this technique, the output signal is despread, filtered, and respread, resulting in a signal, used as a reference signal, that has the desired signal unchanged, but any interference without the correct spreading sequence is distorted. This reference signal can be used with the standard least mean squares (LMS) algorithm: The reference signal is subtracted from the output signal, and this signal is used as an error signal to drive the weights to minimize the mean square error (MMSE) in the output signal. This MMSE algorithm thereby generates weights that maximize the output SINR, i.e., suppress interference and increase desired signal power. These MMSE weights also minimize the bit error rate of the output signal without consideration of the reduction in interference due to despreading.

However, it has been found that any technique that maximizes SINR must do so at the expense of reducing the SNR of the desired signal. In a spread spectrum system, any interference in the output is suppressed by the spreading ratio of the spread spectrum code. Therefore, although it is desirable to distinguish the desired signal from interference when generating the weights, maximizing output SINR may not be desirable as it may result in a reduction in the output SNR over MRC in order to achieve unneeded interference suppression. Therefore, it is desirable to provide a technique for weight generation in a spread spectrum system that maximizes the SNR of the desired signal only.

SUMMARY OF THE INVENTION

The present invention comprises a method and system for weight generation in an adaptive array with spread spectrum signals. Signals received by each antenna are amplified, weighted and summed. Complex weighting is achieved by splitting the signal into inphase and quadrature components, and adjusting the gain of each of these components before combining these weighted components. The output signal after combining of the weighted signals from each antenna is downconverted to baseband, creating inphase and quadrature baseband components. The baseband components are multiplied by the spread spectrum sequence to despread the output signal and reduce the bandwidth of the desired spread spectrum signal to the original desired signal bandwidth. The despread/filtered output signal is then correlated with each of the despread antenna signals.

The signals received by each antenna are also downconverted to baseband inphase and quadrature components. Each of these components is multiplied by the spread spectrum sequence to despread the output signal and reduce the bandwidth of the desired spread spectrum signal to the original desired signal bandwidth. An automatic gain control (AGC) is applied to the output and individual antenna signals to keep the signals within the appropriate levels. The despread/filtered individual antenna signals are multiplied by the despread/filtered output signal to generate antenna weights. In one embodiment, the inphase and quadrature components of each of these signals are multiplied, using the complex conjugate of the despread antenna signals. The weights are then normalized before being applied to the received signal.

This technique maximizes the power of the despread/filtered output signal subject to the normalization of the weights. Although beamforming gain is applied to both the desired signal and interference, the despread/filtered output signal has the interference reduced by the spreading ratio and thus the weights are less affected by the interference than in a conventional Granlund combiner.

In an alternate embodiment, the despread/filtered output signal is respread before multiplying the antenna signals to generate the weights. In this embodiment, the antenna signals are not despread or filtered before multiplying the output signal. Therefore, the number of spread spectrum mixers and filters is reduced. This despreading/filtering/respreading of the output signal creates a signal that has the desired signal unchanged, but the interference in that signal is now uncorrelated with the interference in the received signal. Thus, the weights generated by this method will maximize the power of the output signal, subject to the normalization of the weights, but the weights can only beamform towards the desired signal, not any interference. Thus, the resulting weights should be similar to those of MRC of the desired signal only.

The invention will be more fully described by reference to the following drawings.

BRIEF DESCRIPTION OF THE DRAWINGS

FIG. 4 is a schematic diagram of an alternate embodiment of the invention using despreading/filtering/respreading of the output signals.

DETAILED DESCRIPTION

Figure 1:
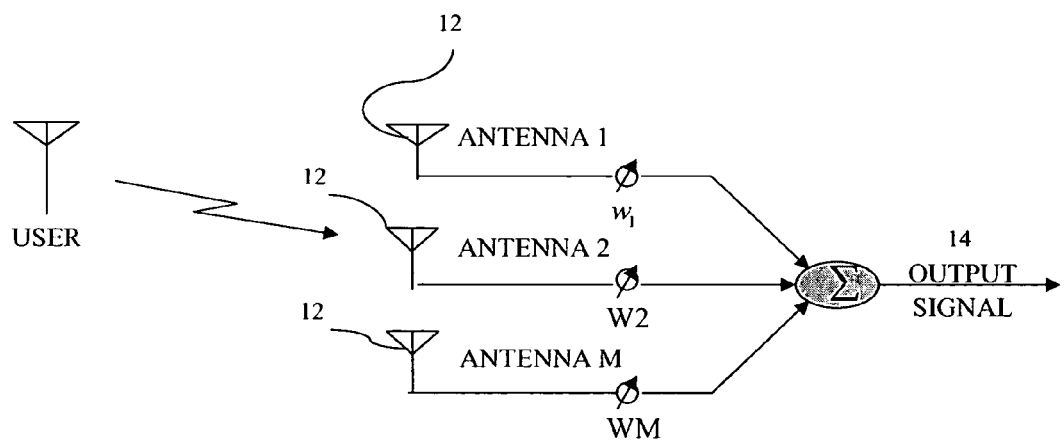
FIG. 1 is a schematic diagram of a prior art adaptive array with M antenna elements.
Figure 2:
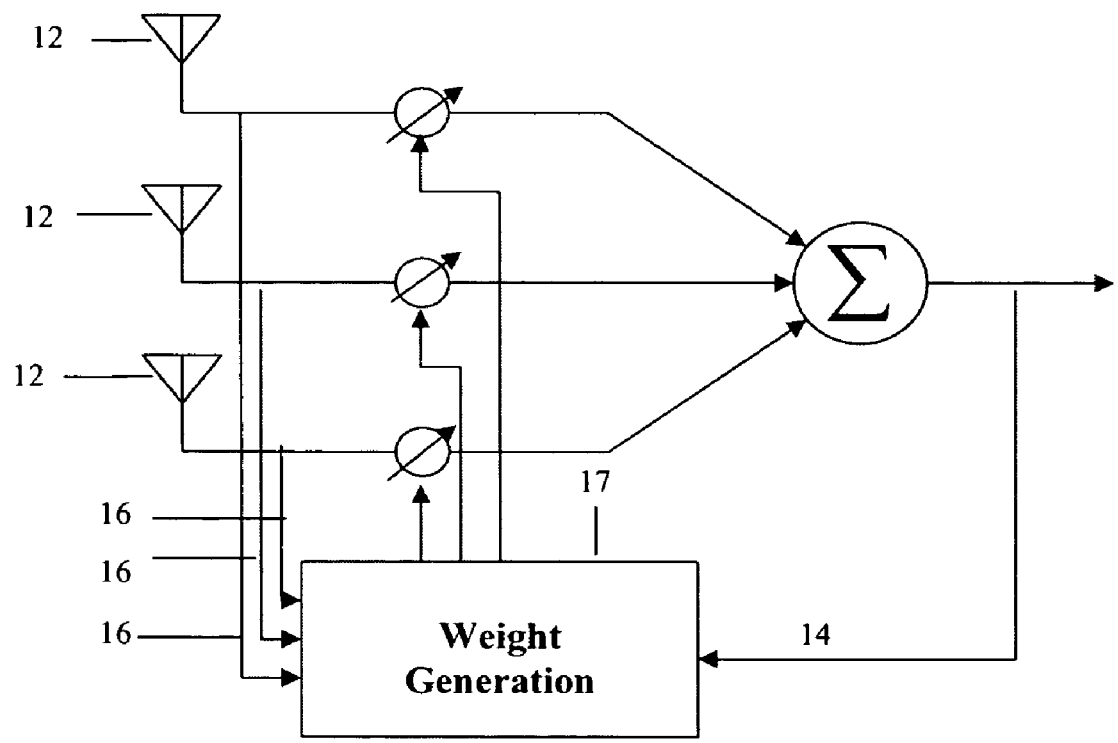
FIG. 2 is a schematic diagram of a prior art adaptive array with weight generation.
Figure 3A:
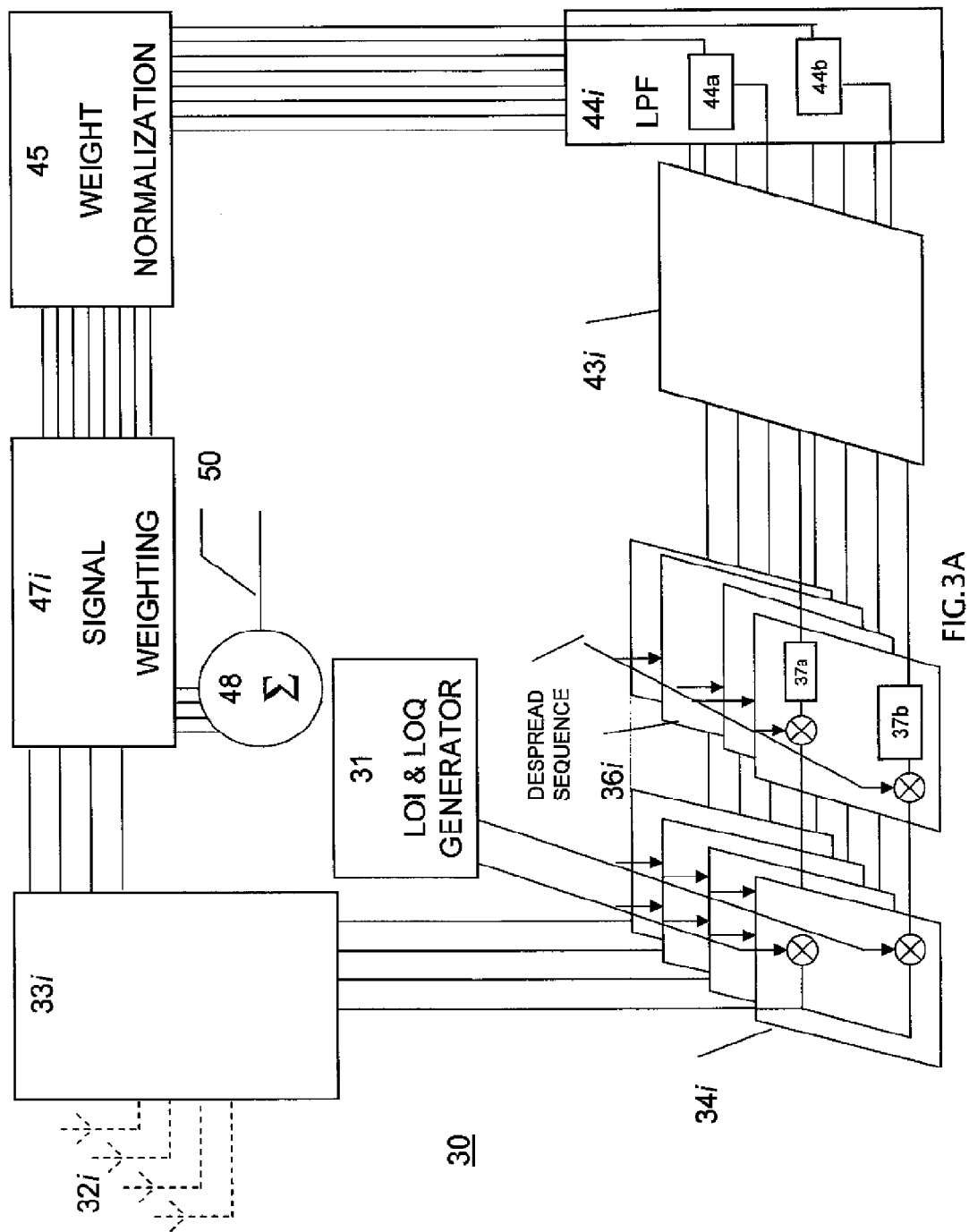
FIG. 3 is a schematic diagram of an embodiment of the present invention using despreading of the output and received signals.
Figure 3B:
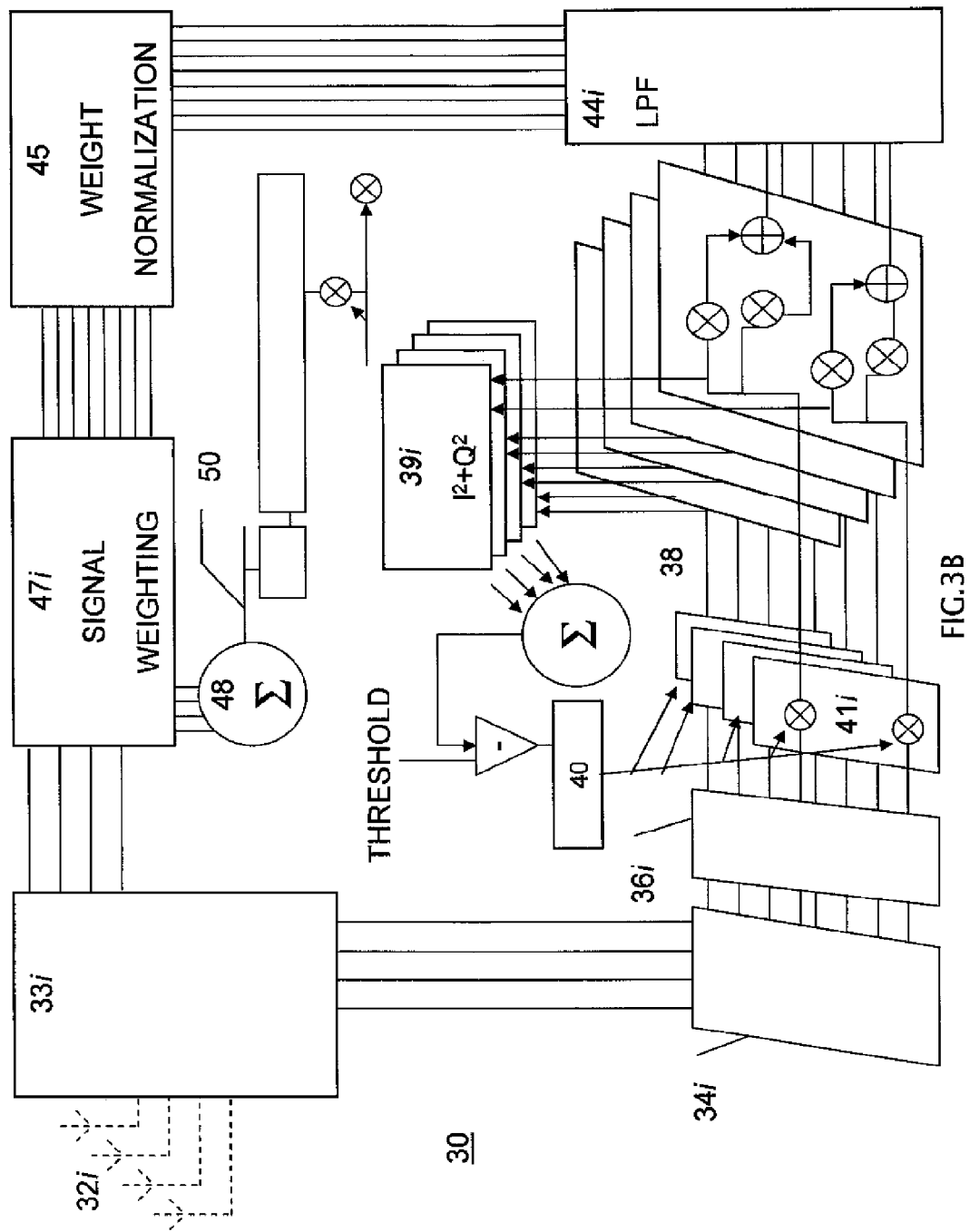
Figure 3C:
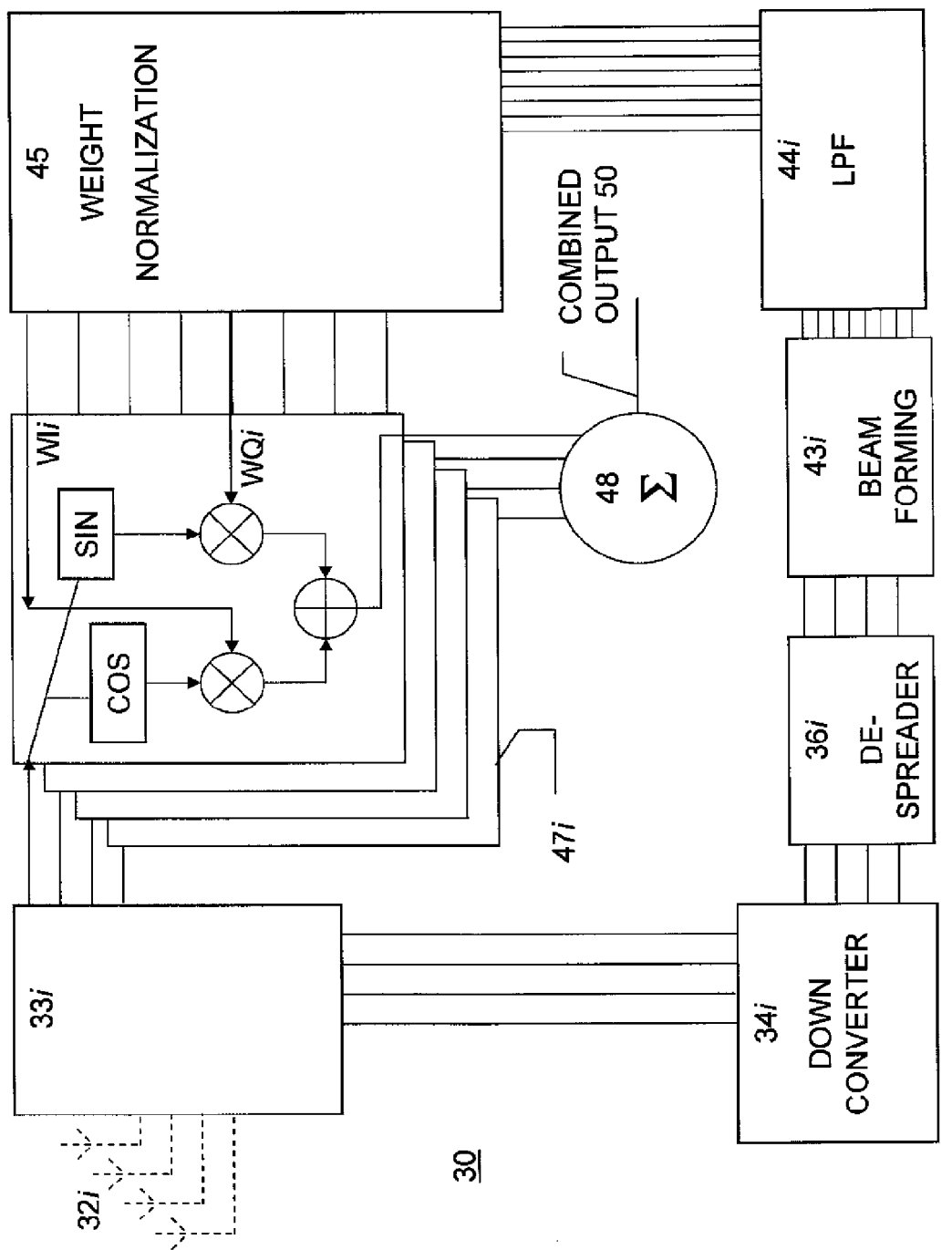
Figure 3D:
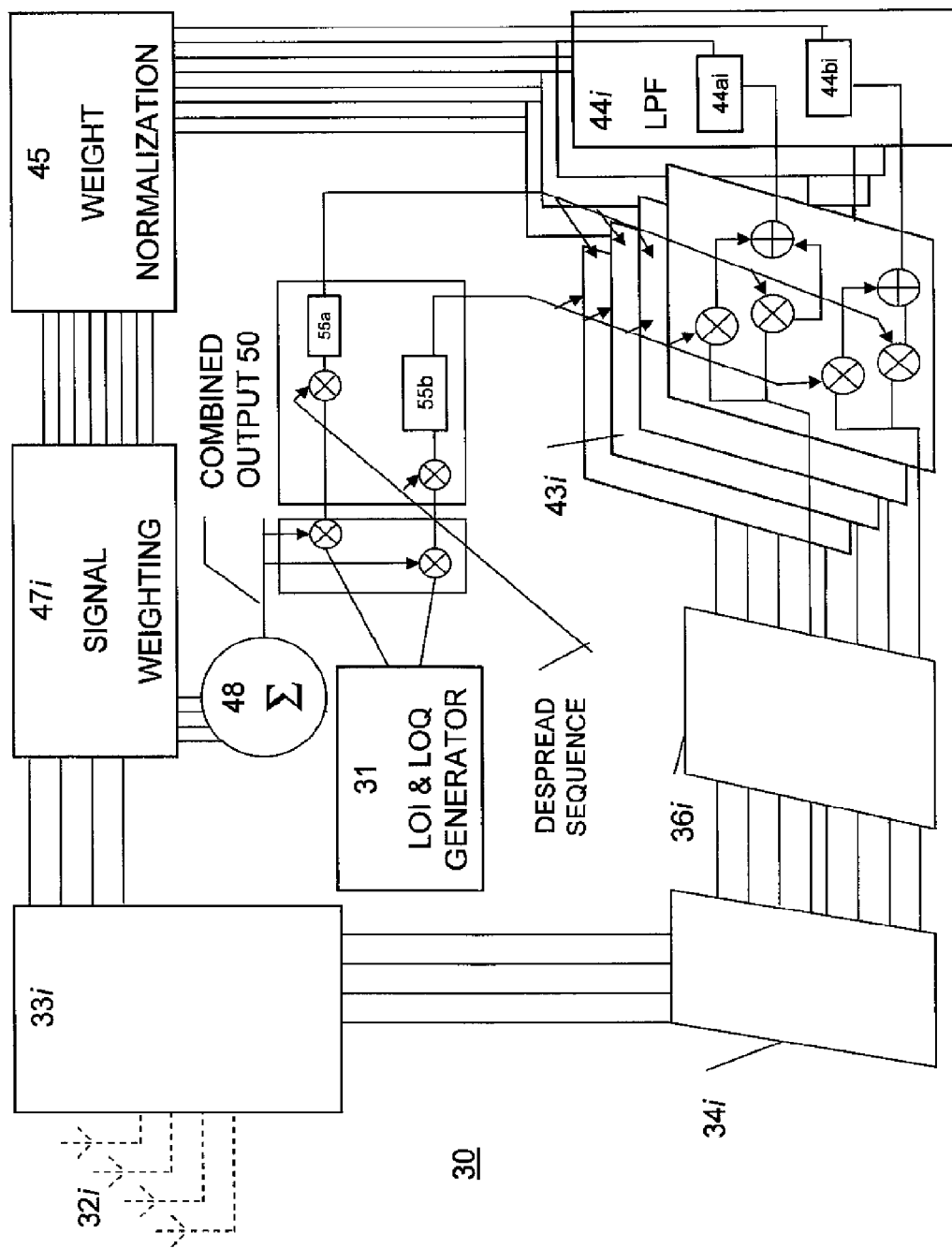

Reference will now be made in greater detail to a preferred embodiment of the invention, an example of which is illustrated in the accompanying drawings, specifically FIGS. 3 and 4. Wherever possible, the same reference numerals will be used throughout the drawings and the description to refer to the same or like parts.

From FIG. 3, within a system for weight generation in an adaptive array with spread spectrum 30 are amplifiers 33$i$ coupling a plurality of antennas 32$i$ and along which system 30 may receive (or transmit) signals. In this example, four antennas are used. It is appreciated to one of ordinary skill in the art that various embodiments using different numbers of antennas could be used with the teachings of the present invention. The signals are amplified in amplifiers 33$i$. The outputs of amplifiers 33$i$ are downconverted to baseband inphase and quadrature components in respective downconverters 34$i$. Each of downconverters 34$i$ multiplies the output of respective amplifiers 33$i$ by local oscillator inphase signal (LOI) and local oscillator quadrature phase signal (LOQ) generated by LO generator 31 in respective multipliers. The local oscillator centers its frequency at the frequency of the desired signal. It will be appreciated that various numbers of antennas and processing elements could be used in accordance with the teachings of the present invention.

Each of these components is multiplied by the spread spectrum sequence in a plurality of first despreader/filter modules which each comprise a pair of multipliers 36$a$, 36$b$ and a pair of low pass filters 37$a$, 37$b$. The multipliers despread the output signal and the resultant signals are applied to respective low pass filters (LPF) 37$a$, 37$b$ to reduce the bandwidth of the desired spread spectrum signal to the original desired signal bandwidth. The configuration of multipliers 36$a$ and 36$b$ and low pass filters 37$a$ and 37$b$ can collectively be referred to as a first despreader/filter module.

A baseband automatic gain control (AGC) loop uses multipliers 41$i$ to keep the signals within the appropriate levels. Power detectors 39$i$ are applied to add the signal power of all antennas and compare the signal power to a threshold level. The difference between the signal power of all antennas and the threshold value can be integrated in an integrator to maintain the signal level after AGC at the same level and can be used to adjust the gain. Filtering of the despread output signal can be performed with a bandwidth comparable to a data bandwidth in the desired signal.

The individual antenna signal components are multiplied by the despread/filtered combined output signal components in multipliers and summed to generate the weights in each beamforming module (or unit) 43$i$. In one embodiment, the inphase and quadrature components of each of these signal are multiplied, using the complex conjugate of the antenna signal, as follows:

$$WI_i = I_{out}I_i + Q_{out}Q_i$$

$$WQ_i = Q_{out}I_i - I_{out}Q_i$$

where $WI_i$ and $WQ_i$ where i equals 1 through M, where M is the number of antennas, are the inphase and quadrature components of the weight of antenna i, one of said plurality of said antennas receiving said plurality of input signals, respectively, $I_{out}$ and $Q_{out}$ are the baseband inphase and quadrature components of the despread/filtered output signal, respectively, and $I_i$ and $Q_i$ are the baseband inphase and quadrature components of the despread/filtered input signal for antenna i, one of said plurality of antennas, respectively. Signal components from beam forming modules 43$i$ are applied to low pass filter modules 44$i$ each comprising (LPF) 44$a$ and low pass filter (LPF) 44$b$ to determine raw signal weights. A first low pass filter 44$a$ and a second low pass filter 44$b$ can be collectively referred to as a low pass filter module 44$i$. Each pair of signal components from one of the plurality of beam forming modules 43$i$ are applied to one of a plurality of low pass filter modules 44$i$.

The raw signal weights are then normalized in weight normalization module 45 before being applied to the received signal. The outputs of weight normalization module 45 are antenna weights 46 ($WI_i$, $WQ_i$, i=1,2,3,4).

The outputs of amplifiers 33$i$ are applied to respective signal weighting modules 47$i$ and are each multiplied by antenna weights 46 ($WI_i$, $WQ_i$, i=1,2,3,4). The output of signal weighting modules 47$i$ are combined in summer 48 to generate combined output signal 50.

Combined output signal 50 is also applied to downconverter 52 and is multiplied by LOI and LOQ in respective multipliers 53$a$, 53$b$ to downconvert combined output signal 50 to baseband, creating inphase and quadrature baseband components. The baseband components of the combined output signal are applied to a second despreader/filter module comprising a pair of multipliers 54$a$, and 54$b$ and a pair low pass filters 55$a$ and 55$b$. The components of the combined output signal are multiplied by the spread spectrum sequence in multipliers 54$a$, 54$b$ to despread the output signal and filtered in low pass filters 55$a$ and 55$b$ to reduce the bandwidth of the desired spread spectrum signal to the original desired signal bandwidth. The configuration of multipliers 54$a$ and 54$b$ and low pass filters 55$a$ and 55$b$ can collectively be referred to as a second despreader/filter module. The despread/filtered output signal 57 from LPF 55$a$, 55$b$ is applied to an AGC using multipliers 56$a$, 56$b$ to keep the signals within the appropriate levels and then to beam forming modules 43$i$ for correlating the despread/filtered output signal with each of the despread/filtered antenna signals as described above. Filtering of the despread output signal can be performed with a bandwidth comparable to a data bandwidth in the desired signal.

FIG. 4 illustrates an alternate embodiment of the system for weight generation in an adaptive array with spread spectrum 60. Despread/filtered output signal 57 from LPF 55$a$, 55$b$ is respread in multipliers 61a, 61b before being applied to an AGC using multipliers 56a, 56b to keep the signals within the appropriate levels and then to beam forming modules 43i to generate the weights. As compared to system 30 described above, the weight generation in beam forming modules 43i is the same except that the antenna signals in system 60 are not despread or filtered before multiplying the despread/filtered/respread output signal in beamforming modules 43i. Specifically, in this embodiment, the inphase and quadrature components of each of these signals are multiplied, using the complex conjugate of the antenna signals, as follows:

$$WI_i = I'_{out}I'_i + Q'_{out}Q'_i$$

$$WQ_i = Q'_{out}I'_i - I'_{out}Q'_i$$

where $WI_i$ and $WQ_i$ where i equals 1 through M, where M is the number of antennas, are the inphase and quadrature components of the weight of antenna i, one of said plurality of said antennas receiving said plurality of input signals, respectively, $I'_{out}$ and $Q'_{out}$ are the inphase and quadrature components of the despread/filtered/respread output signal, respectively, and $I'_i$ and $Q'_i$ are the baseband inphase and quadrature components of the input signal for antenna i, one of said plurality of antennas, respectively.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A system for operating a wireless communications system receiver coupled to a plurality of antennas for a desired spread spectrum signal comprising:
    means for receiving a plurality of input signals each signal a continuous measured value of radio frequency energy at a respective one of said plurality of antennas;
    means for processing each of the received input signals into a baseband inphase and quadrature components,
    means for applying a spread spectrum sequence to said baseband inphase and quadrature components of each of the received input signals to form a plurality of despread input signals;
    means for filtering the plurality of despread input signals to form a plurality of despread/filtered input signals;
    means for weighting said plurality of input signals;
    means for combining said weighted despread input signals to form an output signal;
    means for processing said output signal into baseband inphase and quadrature components; and
    means for applying a spread spectrum sequence to said baseband inphase and quadrature components of said output signal to form a despread output signal,
    means for filtering the despread output signal to form a despread/filtered output signal,
    wherein weights used in said means for weighting are generated from said despread/filtered input signals and said despread/filtered output signal.

2. The system of claim 1 wherein said weights are determined as $$WI_i = I_{out}I_i + Q_{out}Q_i$$

$$WQ_i = Q_{out}I_i - I_{out}Q_i$$

where $WI_i$ and $WQ_i$ where i equals 1 through M, where M is the number of antennas, are the inphase and quadrature components of the weight of antenna i, one of said plurality of said antennas receiving said plurality of input signals, respectively, $I_{out}$ and $Q_{out}$ are the baseband inphase and quadrature components of the despread/filtered output signal, respectively, and $I_i$ and $Q_i$ are the baseband inphase and quadrature components of the despread/filtered input signal for antenna i, one of said plurality of antennas, respectively.

3. The system of claim 1 wherein said weighting means further comprises:
    means for adjusting gain of said despread/filtered input signals within an appropriate level.

4. The system of claim 1 wherein:
    said means for filtering said despread input signals before said weighting means is with a bandwidth comparable to a data bandwidth in a desired signal.

5. The system of claim 1 wherein
    said means for filtering said despread output signal is with a bandwidth comparable to a data bandwidth in a desired signal.

6. The system of claim 1 further comprising:
    means for normalizing said weights before being provided to said means for weighting.

7. An apparatus for processing a plurality of received signals, each signal received at one of a plurality of antennas coupled to the apparatus; the apparatus comprising:
    a plurality of baseband converters, each coupled to a respective one of said plurality of antennas;
    a plurality of first despreader/filter modules, each coupled to a respective one of said baseband converters;
    a plurality of beam forming modules, each coupled to a respective one of said plurality of first despreader/filter modules;
    a plurality of low pass filter modules, each coupled to a respective one of said plurality of beam forming modules;
    a weight normalization module coupled to the plurality of low pass filter modules;
    a plurality of signal weighting modules each coupled to a respective one of said plurality of antennas and to said weight normalization module;
    a combiner coupled to each of said plurality of signal weighting modules to produce a combined signal;
    a baseband converter coupled to the output of combiner;
    a second despreader/filter module coupled to the output of the baseband converter and to each of the plurality of beam forming modules;
    wherein each of the plurality of beam forming modules is configured to generate a plurality of weights based on respective output of the first plurality of despreader/filter modules and the output of the second despreader/filter module, and wherein
    each of the plurality of signal weighting modules is configured to weight and combine a respective received signal, using weights generated by the normalization module to reduce noise and interference.

8. The apparatus of claim 7 wherein said weights are generated using a complex conjugate of the received signals.

9. The apparatus according to claim 7, wherein, each of the plurality of first despreader/filter modules applies a spread spectrum sequence to baseband inphase and quadrature components of the received signals.

10. The apparatus of claim 7 wherein the second despreader/filter module applies a spread spectrum sequence to baseband inphase and quadrature components of the combined signal.

11. The apparatus of claim 7 wherein said weights are determined as $$WI_i = I_{out}I_i + Q_{out}Q_i$$

$$WQ_i = Q_{out}I_i - I_{out}Q_i$$

where $WI_i$ and $WQ_i$ where i equals 1 through M, where M is the number of antennas, are the inphase and quadrature components of the weight of antenna i, one of said plurality of said antennas receiving said plurality of input signals, respectively, $I_{out}$ and $Q_{out}$ are the baseband inphase and quadrature components of the despread/filtered output signal, respectively, and $I_i$ and $Q_i$ are the baseband inphase and quadrature components of the despread/filtered input signal for antenna i, one of said plurality of antennas, respectively.

12. The apparatus according to claim 7 wherein an automatic gain controlled unit is used in each beam forming unit for adjusting the gain of the input signals within an appropriate level.

13. The apparatus according to claim 12 wherein:
each despreader/filter module uses a bandwidth comparable to a data bandwidth in a desired signal for filtering said input signals wherein each despreader/filter module comprises
one of a pair of despreader multipliers, the despreader multipliers coupled to one of
a pair of low pass filters, each low pass filter coupled to one of the pair of gain control multipliers.

14. The apparatus of claim 7 wherein
said second despreader/filter module uses a bandwidth comparable to a data bandwidth in a desired signal for filtering an output of the baseband converter, wherein the second despreader/filter module comprises
a pair of despreader multipliers, each coupled to
a respective low pass filter; each lowpass filter is coupled to
a pair of respreader multipliers, each respreader multiplier coupled to
a respective gain control multiplier, wherein the respreader and despreader multipliers of the second despreader/filter module receive a spread spectrum sequence and the plurality of first despreader/filter modules do not, and the gain control multipliers received an output of a single integrator.

15. A method for operating an apparatus for processing a plurality of received signals received at a plurality of antennas; the method comprising the steps of:
receiving a plurality of input signals;
weighting said plurality of input signals;
combining said weighted input signals to form an output signal;
processing said output signal into baseband inphase and quadrature components;
applying a spread spectrum sequence to said baseband inphase and quadrature components of said output signal to form a despread output signal;
filtering said despread output signal to form a despread/filtered output signal; and
respreading said despread/filtered output signal to form a despread/filtered/re-spread output signal;
wherein weights used in said weighting step are generated from said input signals and said despread/filtered/re-spread output signal; wherein said weights are defined as $$WI_i = I'_{out}I'_i + Q'_{out}Q'_i$$

$$WQ_i = Q'_{out}I'_i - I'_{out}Q'_i$$

where $WI_i$ and $WQ_i$ where i equals 1 through M, where M is the number of antennas, are the inphase and quadrature components of the weight of antenna i, one of said plurality of said antennas receiving said plurality of input signals, respectively, $I'_{out}$ and $Q'_{out}$ are the inphase and quadrature components of the despread/filtered/respread output signal, respectively, and $I'_i$ and $Q'_i$ are the baseband inphase and quadrature components of the input signal for antenna i, one of said plurality of antennas, respectively.

16. The method of claim 15 further comprising the steps of:
normalizing said weights.

17. A method for operating an apparatus for processing a plurality of received signals received at a plurality of antennas; the method comprising the steps of:
receiving a plurality of input signals;
processing each of the received input signals into baseband inphase and quadrature components;
applying a spread spectrum sequence to said baseband inphase and quadrature components of each of the received input signals to form a plurality of despread input signals;
filtering the plurality of despread input signals to form a plurality of despread/filtered input signals;
weighting said plurality of input signals;
combining said weighted input signals to form an output signal;
processing said output signal into baseband inphase and quadrature components;
applying a spread spectrum sequence to said baseband inphase and quadrature components of said output signal to form a despread output signal; and
filtering the despread output signal to form a despread/filtered output signal, wherein weights used in said weighting step are determined as $$WI_i = I_{out}I_i + Q_{out}Q_i$$

$$WQ_i = Q_{out}I_i - I_{out}Q_i$$

where $WI_i$ and $WQ_i$ where i equals 1 through M, where M is the number of antennas, are the inphase and quadrature components of the weight of antenna i, one of said plurality of said antennas receiving said plurality of input signals, respectively, $I_{out}$ and $Q_{out}$ are the baseband inphase and quadrature components of the despread/filtered output signal, respectively, and $I_i$ and $Q_i$ are the baseband inphase and quadrature components of the despread/filtered input signal for antenna i, one of said plurality of antennas, respectively.

18. The method of claim 17 wherein said step of weighting said plurality of despread/filtered input signals further comprises the step of:
adjusting gain of said despread input signals within an appropriate level.

19. The method of claim 17 wherein said step of
filtering the plurality of despread input signals is performed with a bandwidth comparable to a data bandwidth in a desired signal.

20. The method of claim 17 wherein said step of
filtering of said despread output signals is performed with a bandwidth comparable to a data bandwidth in a desired signal.

21. The method of claim 17 further comprising the step of:
normalizing said weights.

* * * * *